United States Patent [19]

Kitamura

[11] Patent Number: 4,979,891
[45] Date of Patent: Dec. 25, 1990

[54] MOLD FOR MOLDING OPTICAL DISK BASE

[75] Inventor: Takehiko Kitamura, Chiba, Japan
[73] Assignee: Sumitomo Heavy Industries, Ltd., Tokyo, Japan
[21] Appl. No.: 391,012
[22] Filed: Aug. 9, 1989
[30] Foreign Application Priority Data Aug. 16, 1988 [JP] Japan .................... 63-203414

[51] Int. Cl.$^5$ ............................................. B29C 45/40
[52] U.S. Cl. ................................. 425/437; 249/66 A;
249/66 C; 249/67; 249/66.1; 264/1.3; 264/107;
425/556; 425/589
[58] Field of Search ............... 425/589, 810, 437, 556,
425/436 R, 595; 264/1.3, 106, 107, 335;
149/66.1, 141; 249/66 A, 66 C, 67, 68

[56] References Cited

U.S. PATENT DOCUMENTS 4,707,321 11/1987 Segawa et al. .................... 264/106

FOREIGN PATENT DOCUMENTS 59-176029 10/1984 Japan .................... 264/107
62-105616 5/1987 Japan .
62-275722 11/1987 Japan .

Primary Examiner—Jay H. Woo
Assistant Examiner—Khanh P. Nguyen
Attorney, Agent, or Firm—Armstrong, Nikaido, Marmelstein, Kubovcik & Murray

[57] ABSTRACT

A mold for forming an optical disk base provided with a movable specular plate, a stationary specular plate, and an annular stamper having inner and outer peripheral edges. The reverse surface of the stamper is in contact with one of the specular plates, and the stamper is supported at its inner end portion by an inner stamper retainer and at its outer end portion by an outer stamper retainer. A cavity is formed between the stamper and the other one of the specular plates when the mold is closed. This mold further has: a circumference ring having an extreme end surface located inside the outer stamper retainer in the radial direction and facing a surface of the stamper, and an inner peripheral surface defining an outer peripheral surface of the cavity, the circumference ring being supported on the other specular plate so as to be movable in the mold opening/closing direction; and an actuator for moving the circumference ring between a position at which the extreme end surface abuts against the stamper and a position at which the extreme end surface is flush with the specular surface of the other specular plate or is recessed from this surface away from the cavity.

2 Claims, 3 Drawing Sheets

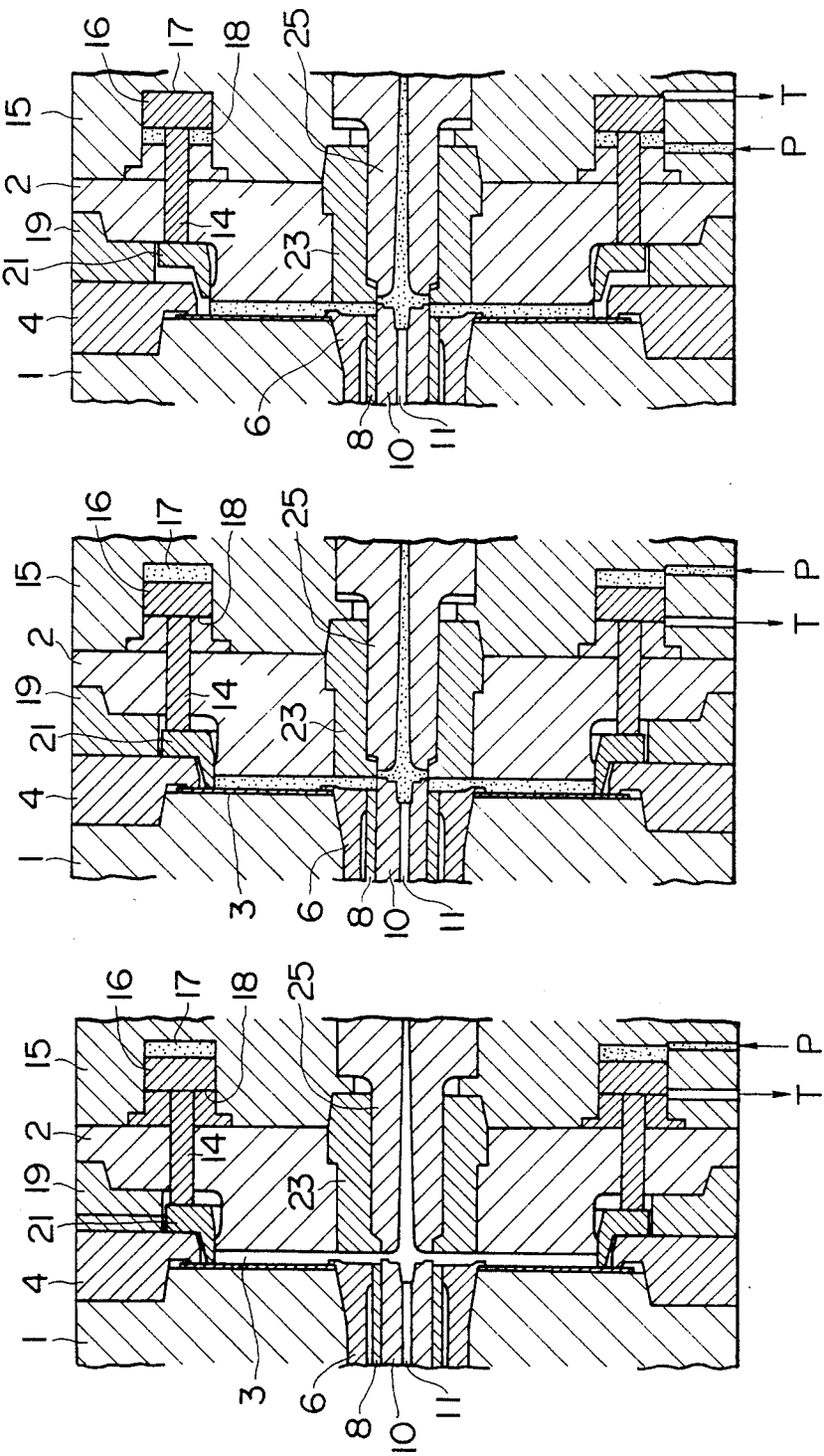

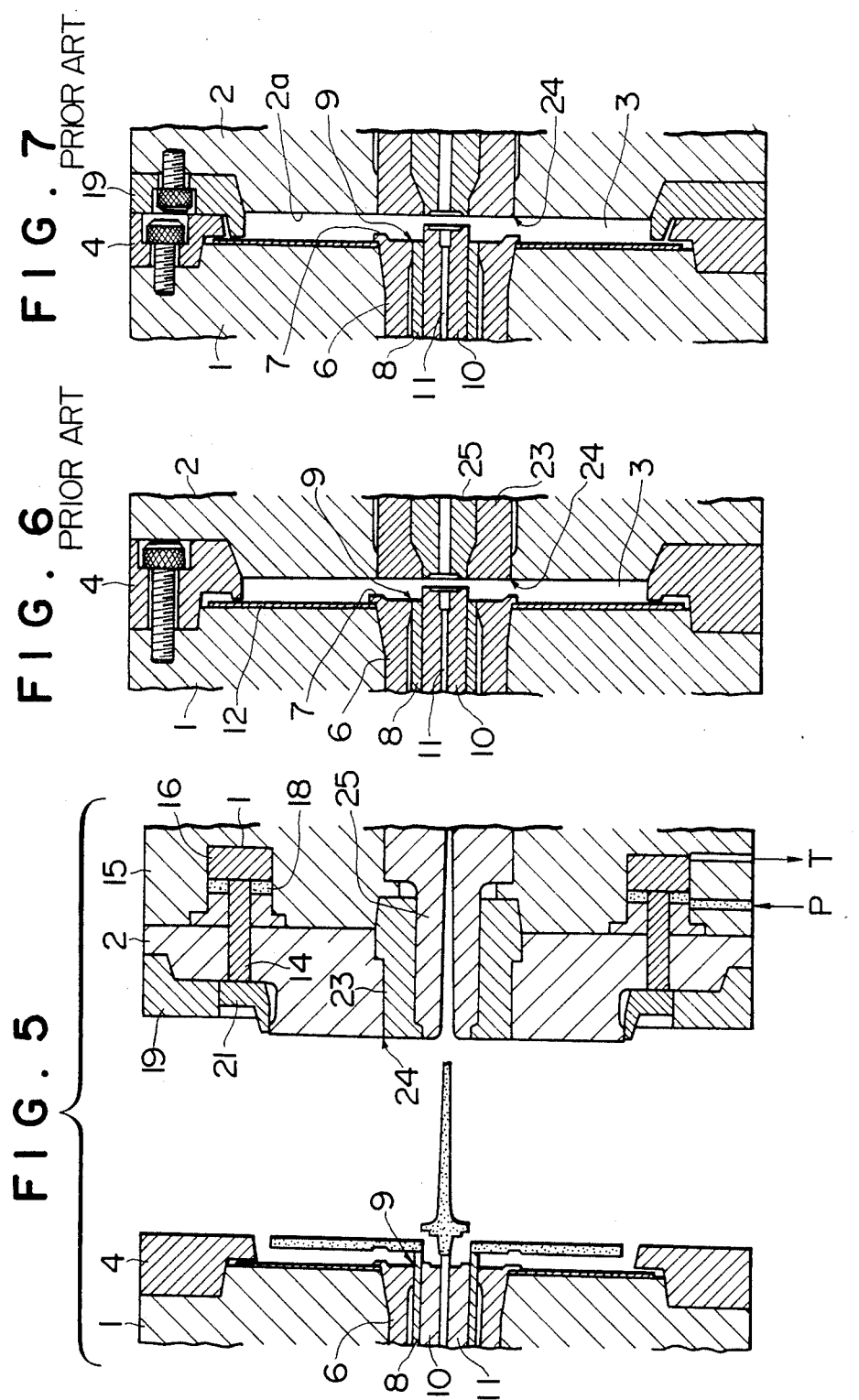

MOLD FOR MOLDING OPTICAL DISK BASE

BACKGROUND OF THE INVENTION

This invention relates to a mold for molding a disk-like recording medium such as an optical disk base (hereinafter referred to simply as "optical disk base").

In a conventional mold for molding an optical disk base such as that shown in FIGS. 6 and 7, a duplication stamper 12 having pit grooves in accordance with recorded information is supported on one of a pair of specular plates (on a movable specular plate 1 in the illustrated example), an inner peripheral portion of the stamper being fixed by an inner damper retainer 6 and an outer peripheral portion of the stamper being fixed by an outer stamper retainer 4. The pair of specular plates (the other of which corresponds to a stationary specular plate 2 in the illustrated example) facing each other are disposed to enable mold closing whereby a cavity 3 is formed. A molten resin is charged in the cavity 3 under pressure and is cooled and solidified to form a molded piece which is taken out of the mold by the mold opening operation of the specular plates 1 and 2. To enable the molded piece to be taken out, an annular air slit 24 is formed between the specular plate 2 and a bushing 23 disposed at the center of the specular plate 2, and another annular slit 9 is formed between the inner stamper retainer 6 attached to the specular plate 1 and a floating punch 8 disposed at the center of the retainer 6. When the molded piece is taken out, it is separated from a specular surface 2a of the specular plate 2 by compressed air supplied through the air slit 24 immediate before or at the time of mold opening. The molded piece is then separated from the stamper 12 by compressed air supplied through the air slit 9 and is thereafter pushed out by the floating punch 8, thus effecting mold release. The outer diametral end surface of the molded piece is defined by an inner peripheral surface of the outer stamper retainer 4 if no specific member for defining this surface is provided. In a case where a cavity ring is provided so that its portion is located inside the outer stamper retainer in the radial direction, the outer diametral end surface of the molded piece is defined by an inner peripheral surface of this ring. In a case where an annular slide member is provided on the side of one of the pair of specular plates to the other of which the stamper is attached and where the annular slide member is maintained in abutment with the stamper by the force of a spring or the like at the time of mold closing (this member having a function of limiting occurrence of burr and incapable of receding from the specular surface), the outer diametral end surface of the molded piece is defined by an inner peripheral surface of this member. (Examples of this arrangement are disclosed in Japanese Patent Unexamined Publication Nos. 62-105616 and 62-275722).

However, if a pressure remained immediately before mold opening is not uniformly applied to the outer diametral end surface of the molded piece, or if portions of the outer diametral end surface of the molded piece have different resistances to the mold release force, the compressed air supplied through the air slits 9 and 24 does not spread out smoothly and uniformly. In particular, separation of part of the molded piece at a position where the remaining pressure or the mold release resistance is larger is retarded, resulting in a deformation of the molded piece and, hence, a deterioration in the mechanical characteristics requisite for the optical disk base, e.g., warp or vibration of the recording surface.

SUMMARY OF THE INVENTION

In view of these problems, an object of the present invention is to reduce the possibility of mold release failure and to thereby prevent any mechanical deformation of the molded piece.

To this end, the present invention provides a mold for forming an optical disk base, including a movable specular plate having a specular surface, a stationary specular plate having a specular surface, an annular stamper having inner and outer peripheral edges in which the reverse surface of the stamper is in contact with one of the specular plates, an inner end portion of the stamper is fixed by an inner stamper retainer while an outer end portion of the stamper is fixed by an outer stamper retainer, and a cavity is formed between the stamper and the other one of the specular plates when the mold is closed, the mold further including: a circumference ring having an extreme end surface located inside the outer stamper retainer in the radial direction and facing a surface of the stamper, and an inner peripheral surface defining an outer peripheral surface of the cavity, the circumference ring being supported on the other one of the specular plates so as to be movable in the mold opening/closing direction; and an actuator for moving the circumference ring between a position at which the extreme end surface abuts against the stamper and a position at which the extreme end surface is flush with the specular surface of the other one of the specular plates or is recessed therefrom away from the cavity.

BRIEF DESCRIPTION OF THE DRAWINGS

FIGS. 2 to 5 are cross-sectional views illustrating a molding process; and

FIGS. 6 and 7 are cross-sectional views of a conventional example.

DESCRIPTION OF THE PREFERRED EMBODIMENT

Figure 1:
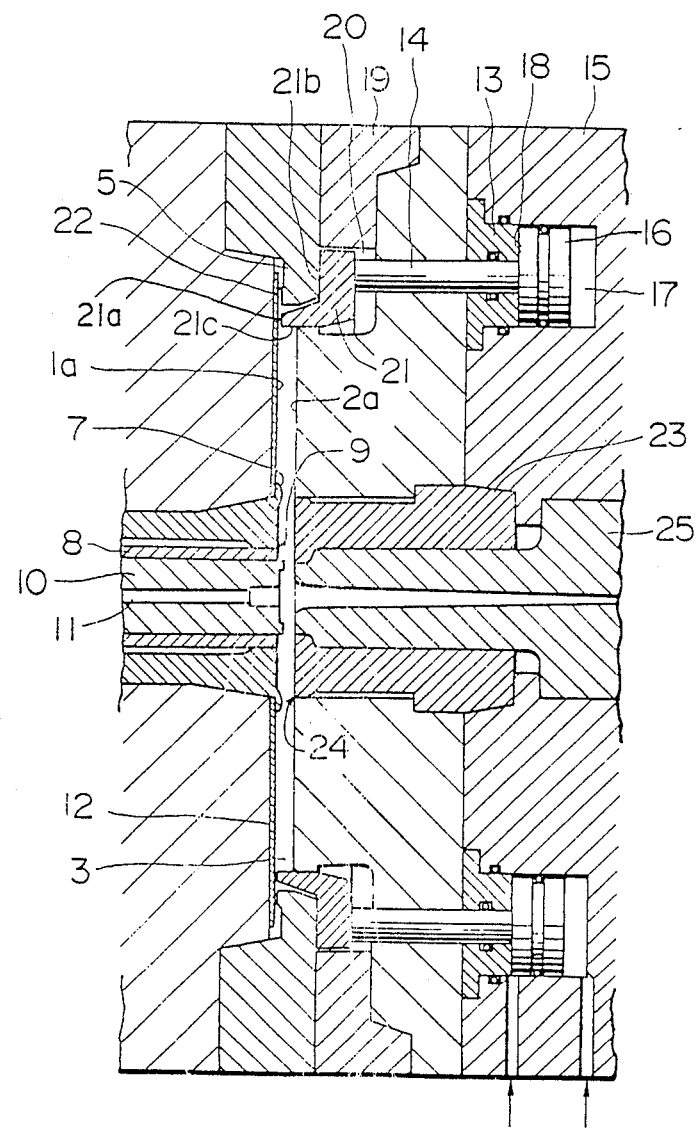
FIG. 1 is a cross-sectional view of an embodiment of the present invention.

An embodiment of the present invention will be described below with reference to the accompanying drawings.

In the accompanying drawings, a reference numeral 1 denotes a movable plate having a specular surface 1a, and a reference numeral 2 denotes a stationary plate having a specular surface 2a. (These plates are hereinafter referred to as specular plates) The specular plate 1 is set by a clamping device so that it can be moved toward or away from the specular plate 2 while facing the same and that a cavity 3 is formed between the specular plates 1 and 2 when the mold is closed.

An outer stamper retainer 4 in the form of a ring has a retaining portion 5 formed at its inner periphery. The outer stamper retainer 4 is attached to an outer peripheral portion of the movable specular plates 1 coaxially with the same so that the retaining portion 5 abuts against the specular surface 1a of the movable specular plate 1.

A cylindrical inner stamper retainer 6 has a retaining portion 7 formed at its outer periphery so as to project outward inside the cavity 3. The inner stamper retainer 6 is attached to a central portion of the movable specular plate 1 coaxially with the same so that the retaining portion 7 abuts against the specular surface 1a of the movable specular plate 1.

A floating punch 8 is fitted in the inner stamper retainer 6. An annular air slit 9 is formed between the floating punch 8 and the inner stamper retainer 6. A gate cut punch 10 and an ejector pin 11 are disposed inside the floating punch 8 coaxially with the same.

A duplication stamper 12 having pit grooves in accordance with recorded information is set on the movable specular plate 1 while being retained at its outer peripheral portion by the retaining portion 5 of the outer stamper retainer 4 and at its inner peripheral portion by the retaining portion 7 of the inner stamper retainer 6.

A plurality of rods 14 are disposed at predetermined pitches along the circumference of the stationary specular plate 2 so as to pass through the specular plate 2 and a bush 13 in the mold opening/closing direction and to be movable in this direction. The stationary specular plate 2 is attached to a stationary die set 15. One or a plurality of pistons 16 connected to the ends of the respective rods 14 on the side of the stationary die set 15 are fitted in the stationary die set 15 so as to be movable in the mold opening/closing direction. Oil chambers 17 and 18 are defined on the opposite sides of each piston 16. A cavity ring 19 is attached to the stationary specular plate 2 coaxially with the same on the side of the cavity 3. An annular groove 20 is formed between the specular plate 2 and the ring 19 so as to be open on the side of the cavity 3. Each rod 14 can be moved to be closer to the cavity 3 by supplying a pressure oil to the oil chamber 17 on the side of the piston 16 remote from the cavity 3 while making the oil chamber 18 on the side of the cavity 3 communicate with an oil tank. Conversely, the rod 14 can be moved away from the movable specular plate 1 by supplying the pressure oil to the oil chamber 18 on the cavity side of the piston 16 while making the oil chamber 17 on the opposite side communicate with the oil tank.

A circumference ring 21 which has a flange portion 22 formed on the side of the cavity 3 is fitted in the annular groove 20. The circumference ring 21 is capable of engaging with the outer stamper retainer 4 when projected to the cavity 3. At this time, the flange portion 22 is located inside the retainer 4. The other end of each rod is connected to the circumference ring 21 on the side thereof remote from the cavity 3. During closing of the mold, the circumference ring 21 is movable in the mold closing/opening direction between a position at which its extreme end surface 21a facing the specular surface 1a of the movable specular plate 1 is flush with the specular surface 2a of the stationary specular plate 2 or is recessed relative to the same away from the cavity 3 and a position at which its extreme end surface 21a abuts against the stamper 12. When the circumference ring 21 projects to the cavity 3 so that an end surface 21b of its step portion contacts the outer stamper retainer 4, the extreme end surface 21a is brought into contact with the stamper 12 and, at the same time, an inner peripheral surface 21c of the ring 21 and the specular surface 2a of the stationary specular plate 2 form right angles, thereby enabling the formation of circumferential end surface of the molded piece.

A bushing 23 is attached to a central portion of the stationary specular plate 2. An annular air slit 24 is formed between the bushing 23 and the stationary specular plate 2. A sprue bush 25 is fitted in the bush 23.

In this embodiment, the stamper 12 and the mechanism for fixing the same are provided on the movable mold part side while the circumference ring 21 and the mechanism for moving the same forward or rearward are provided on the stationary side. However, needless to say, the placement of these groups of components may be reversed.

The operation of this embodiment will be described below.

A pressure oil is supplied to the oil chamber 17 on the side of the piston 16 remote from the cavity 3 by a timing selected as desired within the period of time between the moment at which the mold closing is started and the moment at which the injection is started. At the same time the oil chamber 18 on the side of the cavity 3 is communicated with the oil tank. The piston 16 is thereby moved toward the cavity 3. In consequence, as shown in FIG. 2, the circumference ring 21 is moved by the rods 14 to the mold section on the side of the cavity 3 and is brought into engagement with the outer stamper retainer 4 maintained in contact with the cavity ring 19 during mold closing, thereafter being maintained in this state.

At this time, the extreme end surface 21a of the circumference ring 21 is in abutment with the stamper 12, and the inner peripheral surface 21c and the specular surface 2a of the stationary specular plate 2 form right angles, thereby enabling the formation of the outer diametral end surface of the molded piece. Than, a molten resin is injected by a plasticizing apparatus. As shown in FIG. 3, the molten resin passes through the sprue bush 25, radially flows and spreads out concentrically through a resin passage formed between the bushing 23 and the inner stamper retainer 6, the floating punch 8 and other members, is restricted by the retaining portion 7, and is charged under pressure in the cavity 3 formed between the stamper 12 and the specular surface 2a of the stationary specular plate 2, finally being cooled and solidified. During cooling, other operation including cutting a central gate portion of the molded piece is effected. During this forming also, the circumference ring 21 is retained by being pressed against the outer stamper retainer 4.

At a late stage of cooling of the molded piece, the pressure oil is supplied to the oil chamber 18 on the cavity side of the piston 16 while the oil chamber on the opposite side is communicated with the oil tank, thereby moving the piston 16 away from the cavity 3. In consequence, as shown in FIG. 4, the circumference ring 21 is moved by the rods 14 away from the cavity 3 until it becomes flush with the specular surface 2a of the stationary specular plate 2 or recedes relative to the same away from the cavity 3. The outer diametral end surface of the molded piece is thereby separated from the circumference ring 21.

After the circumference ring 21 has receded, the molded piece is separated from the mold as shown in FIG. 5. That is, the molded piece is separated from the specular surface 21a of the stationary specular plate 2 by compressed air supplied through the air slit 24 immediately before or at the time of mold opening, is then separated from the stamper 12 by compressed air supplied through the air slit 9 and is pushed out by the floating punch 8. When mold opening is thereafter performed, compressed air can be easily and uniformly spread out on both the stationary mold part side and the movable mold part side to make the mold release uniform, since, as mentioned above, the outer diametral end surface of the molded piece has already been separated before the mold opening.

In accordance with the present invention, as described above, the outer diametral end surface of the molded piece is separated from the mating mold part before the molded piece is separated from the stationary specular plate and from the stamper, thereby enabling compressed air supplied for separation from the stationary specular plate and the stamper to be easily and uniformly spread out on both the stationary mold part side and the movable mold part side at the time of mold opening. It is therefore possible to prevent unevenness of mold release. As a result, the possibility of mold release failure and, hence, mechanical deformation of the molded piece is reduced, thereby improving the mold release performance and the quality of the molded piece.

What is claimed is:

1. A mold for forming an optical disk base, including a movable specular plate having a specular surface, a stationary specular plate positioned coaxially with said movable specular plate and having a specular surface, and an annular stamper having inner and outer peripheral edges and positioned upon the specular surface of one of said specular plates, an inner end portion of said stamper being fixed by an inner stamper retainer while an outer end portion of said stamper being fixed by an outer stamper retainer, said inner and outer stamper retainers being positioned on said one of said specular plates, and a cavity being formed between said stamper and the other of said specular plates when said mold is closed, said mold further comprising:

an annular retrievable ring having an axially extreme end surface adapted to abut against said stamper and an inner peripheral surface slidably contacting an outer circumferential surface of said other of said specular plates for defining an outer peripheral boundary of said cavity, said retrievable ring being coaxially supported on said other of said specular plates and movable in the axial opening and closing direction of the mold;

an actuator for moving said retrievable ring between a first position where said extreme end surface abuts against said stamper and a second position where said extreme end surface is at least flush with the specular surface of said other of said specular plates;

a first air flow means positioned in said one of said specular plates for passing an air flow into said cavity; and a second air flow means positioned in said other of said specular plates for passing an air flow into said cavity, wherein said first and second air flows readily drain out of said cavity when said retrievable ring moves to said second position.

2. A mold according to claim 1, wherein said extreme end surface is further retrieved away from the specular surface of said other of said specular plates.

* * * * *